United States Patent
Li et al.

(10) Patent No.: US 11,310,805 B2
(45) Date of Patent: Apr. 19, 2022

(54) INTERLEAVED MAPPING METHOD AND APPARATUS

(71) Applicant: BEIJING XIAOMI MOBILE SOFTWARE CO., LTD., Beijing (CN)

(72) Inventors: Yuanyuan Li, Beijing (CN); Ming Zhang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/078,424

(22) Filed: Oct. 23, 2020

(65) Prior Publication Data

US 2021/0045129 A1 Feb. 11, 2021

Related U.S. Application Data

(63) Continuation of application No. PCT/CN2018/084299, filed on Apr. 24, 2018.

(51) Int. Cl.
 *H04W 72/08* (2009.01)
 *H04L 5/00* (2006.01)
 *H04L 67/75* (2022.01)

(52) U.S. Cl.
 CPC ......... *H04W 72/082* (2013.01); *H04L 5/0075* (2013.01); *H04L 67/36* (2013.01)

(58) Field of Classification Search
 CPC ............. H04W 72/082; H04W 72/044; H04W 72/0493; H04L 5/0075; H04L 67/36; H04L 1/0071; H04L 5/003
 See application file for complete search history.

(56) References Cited

U.S. PATENT DOCUMENTS

| 2010/0195583 | A1 | 8/2010 | Nory et al. |
| 2013/0010685 | A1* | 1/2013 | Kim ................ H03M 13/6525 370/315 |

(Continued)

FOREIGN PATENT DOCUMENTS

| CN | 102804608 A | 11/2012 |
| CN | 103621164 A | 3/2014 |
| CN | 107852264 A | 3/2018 |

OTHER PUBLICATIONS

Huawei, HiSilicon, "Remaining issues and TP on interleaved CCE-to-REG mapping",3GPP TSG RAN WG1 Ad Hoc leeting, Vancouver, Canada, R1-1800817, Jan. 22-26, 2018, 5 pages (Year: 2018).*

(Continued)

*Primary Examiner* — Hardikkumar D Patel
(74) *Attorney, Agent, or Firm* — Syncoda LLC; Feng Ma

(57) ABSTRACT

An interleaved mapping method includes: interleaving a virtual sequence of first physical resource element bundles according to an interleaving function, wherein the first physical resource element bundles include actual physical resource element bundles and one or more virtual physical resource element bundles; marking a physical resource element bundle in the interleaved first physical resource element bundles without any corresponding actual physical resource element bundle as an invalid physical resource element bundle; determining a first correspondence of the valid physical resource element bundles in the interleaved first physical resource element bundles with respect to an actual sequence of the actual physical resource element bundles; and determining, based on the first correspondence and a second correspondence of logical resource elements with respect to the actual sequence, a mapping relationship between the logical resource elements and the actual physical resource element bundles.

17 Claims, 4 Drawing Sheets

(56) References Cited

U.S. PATENT DOCUMENTS

| 2015/0146672 | A1* | 5/2015 | Wu | H04L 5/0053 370/329 |
| 2018/0035332 | A1 | 2/2018 | Agiwal et al. | |
| 2018/0254853 | A1 | 9/2018 | Jung et al. | |

OTHER PUBLICATIONS

State Intellectual Property Office of the People's Republic of China, 2nd Office Action and Search Report Issued in Application No. 2018800004511, dated May 7, 2021, 8 pages.
ISA State Intellectual Property Office of the People's Republic of China, Written Opinion of the International Searching Authority Issued in Application No. PCT/CN2018/084299, dated Jan. 22, 2019, WIPO, 8 pages.
State Intellectual Property Office of the People's Republic of China, Office Action and Search Report Issued in Application No. 2018800004511, dated Sep. 14, 2020, 18 pages, (Submitted with Machine Translation).
ISA State Intellectual Property Office of the People's Republic of China, International Search Report Issued in Application No. PCT/CN2018/084299, dated Jan. 22, 2019, WIPO, 4 pages.
Ericsson, Corrections to 38.211, "Draft Change Request", 3GPP TSG-RAN1 Meeting AH18-01, Vancouver, Canada, R1-1800794, Jan. 22-26, 2018, 69 pages.
Huawei, HiSilicon, "Remaining issues and TP on interleaved CCE-to-REG mapping", 3GPP TSG RAN WG1 Ad Hoc Meeting, Vancouver, Canada, R1-1800817, Jan. 22-26, 2018, 5 pages.
Vivo, "Remaining details on PDCCH structure", 3GPP TSG RAN WG1 Meeting #92, Athens, Greece, R1-1801530, Feb. 26-Mar. 2, 2018, 4 pages.

* cited by examiner

Determine the first correspondence g(m)=f(j) between an actual sequence number $m$ and a virtual sequence number $j$, where when f(j) is valid, g(m)=f(j) is marked, and when f(j) is invalid, a value of $j$ is increased until f(j) is valid, and g(m)=f(j) is marked — S31

FIG. 3

Determine, based on an order of the actual sequence numbers and a quantity of physical resource element bundles included in one logical resource element, the second correspondence between a logical resource element and an actual sequence number — S41

Determine the mapping relationship between the logical resource elements and the actual physical resource element bundles based on the first correspondence and the second correspondence — S42

FIG. 4

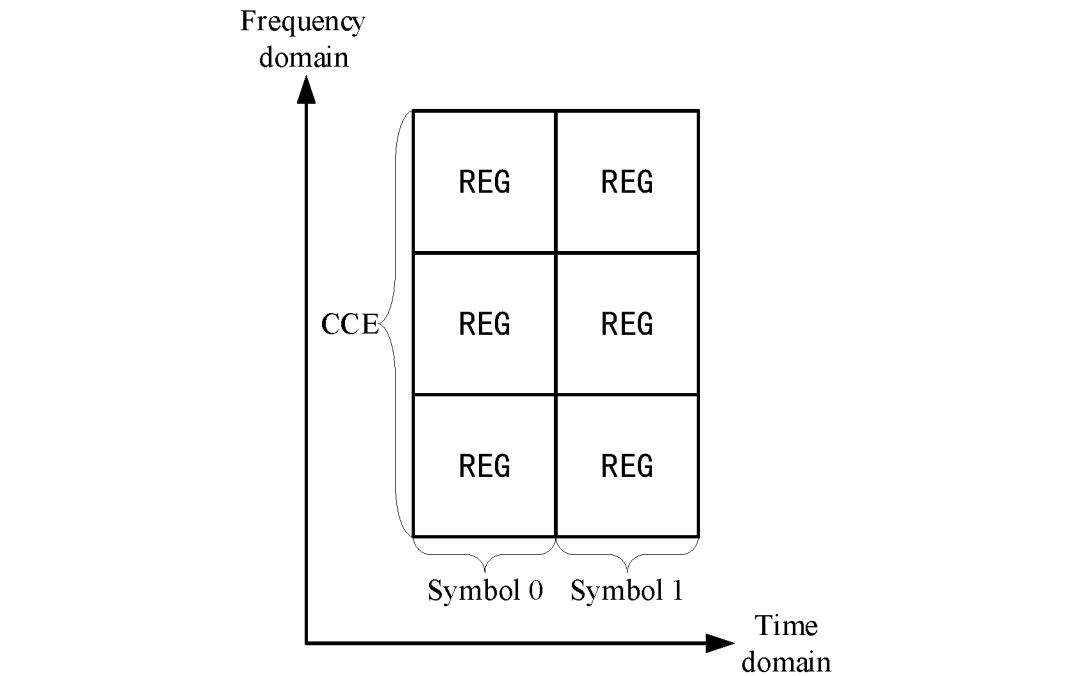

FIG. 5

INTERLEAVED MAPPING METHOD AND APPARATUS

CROSS-REFERENCE TO RELATED APPLICATION

The present disclosure is a continuation of International Application No. PCT/CN2018/084299 filed on Apr. 24, 2018, the disclosure of which is hereby incorporated by reference in its entirety.

BACKGROUND

In the related art, to increase diversity gain and randomization degree of interference, when mapping logical resource elements to physical resource elements, a sequence of the physical resource elements needs to be interleaved first, and then the logical resource elements are mapped to the physical resource elements.

SUMMARY

The present disclosure relates generally to the technical field of terminals, and more specifically to interleaved mapping methods, interleaved mapping apparatuses, an electronic device, and a computer-readable storage medium.

Various embodiments of the present disclosure provide an interleaved mapping method, an interleaved mapping apparatus, an electronic device, and a computer-readable storage medium.

According to a first aspect of examples of the present disclosure, an interleaved mapping method is provided, the method includes:

interleaving a virtual sequence of first physical resource element bundles according to an interleaving function, wherein the first physical resource element bundles comprise actual physical resource element bundles and one or more virtual physical resource element bundles;

marking a physical resource element bundle in the interleaved first physical resource element bundles without any corresponding actual physical resource element bundle as an invalid physical resource element bundle;

determining a first correspondence of the valid physical resource element bundles in the interleaved first physical resource element bundles with respect to an actual sequence of the actual physical resource element bundles; and determining, based on the first correspondence and a second correspondence of logical resource elements with respect to the actual sequence, a mapping relationship between the logical resource elements and the actual physical resource element bundles.

In some embodiments, marking the physical resource element bundle in the interleaved first physical resource element bundles without any corresponding actual physical resource element bundle as the invalid physical resource element bundle includes:

determining a quantity of actual physical resource element bundles comprised in the first physical resource element bundles;

determining, according to a relationship between an interleaving sequence number of an interleaved first physical resource element bundle and the quantity, the invalid physical resource element bundle in the interleaved first physical resource element bundles that does not correspond to any actual physical resource element bundle; and marking the invalid physical resource element bundle.

In some embodiments, the interleaving function is:

$$f(j) = (rC + c + n_{shift}) \bmod (CR),$$

where, j represents a virtual sequence number of the virtual sequence, f(j) refers to an interleaving sequence number after interleaving the virtual sequence number, j=cR+r, r=0, 1, ..., R−1, c=0, 1, ..., C−1, C=[$N^{CORESET}$/(LR)], c refers to a row coordinate of an interleaving matrix corresponding to the function, r refers to a column coordinate of the interleaving matrix, $N^{CORESET}$ refers to an actual quantity of physical resource elements, L refers to a quantity of physical resource elements included in one physical resource element bundle, R refers to a first preset parameter, $n_{shift}$ refers to a second preset parameter, and mod represents an operation for taking a remainder; and marking the physical resource element bundle in the interleaved first physical resource element bundles without any corresponding actual physical resource element bundle as the invalid physical resource element bundle includes:

in response to that f(j) is greater than $N^{CORESET}$/L−1, marking f(j) as invalid.

In some embodiments, determining the first correspondence of the valid physical resource element bundles in the interleaved first physical resource element bundles with respect to the actual sequence of the actual physical resource element bundles includes:

determining the first correspondence g(m)=f(j) between an actual sequence number m of the actual physical resource element bundles and the virtual sequence number j, where in response to that f(j) is valid, g(m)=f(j) is marked, and in response to that f(j) is invalid, a value of j is increased until f(j) is valid, and g(m)=f(j) is marked.

In some embodiments, determining, based on the first correspondence and the second correspondence of the logical resource elements with respect to the actual sequence, the mapping relationship between the logical resource elements and the actual physical resource element bundles includes:

determining, based on an order of the actual sequence numbers and a quantity of physical resource element bundles comprised in one logical resource element, the second correspondence between a logical resource element and an actual sequence number; and determining the mapping relationship between the logical resource elements and the actual physical resource element bundles based on the first correspondence and the second correspondence.

According to a second aspect of examples of the present disclosure, an interleaved mapping apparatus is provided, the apparatus includes:

an interleaving module configured to interleave a virtual sequence of first physical resource element bundles according to an interleaving function, wherein the first physical resource element bundles comprise actual physical resource element bundles and one or more virtual physical resource element bundles;

an invalid marking module configured to mark a physical resource element bundle in the interleaved first physical resource element bundles without any corresponding actual physical resource element bundle as an invalid physical resource element bundle;

a correspondence determining module configured to determine a first correspondence of the valid physical resource element bundles in the interleaved first physical resource element bundles with respect to an actual sequence of the actual physical resource element bundles; and a mapping determining module configured to determine, based on the first correspondence and a second correspondence of logical resource elements with respect to the actual sequence, a mapping relationship between the logical resource elements and the actual physical resource element bundles.

In some embodiments, the invalid marking module includes:

a quantity determining submodule configured to determine a quantity of actual physical resource element bundles comprised in the first physical resource element bundles;

an invalid determining submodule configured to determine, according to a relationship between an interleaving sequence number of an interleaved first physical resource element bundle and the quantity, the invalid physical resource element bundle in the interleaved first physical resource element bundles that does not correspond to any actual physical resource element bundle; and a marking submodule configured to mark the invalid physical resource element bundle.

In some embodiments, the interleaving function is:

$$f(j) = (rC + c + n_{shift}) \mod(CR),$$

where, j represents a virtual sequence number of the virtual sequence, f(j) refers to an interleaving sequence number after interleaving the virtual sequence number, $j = cR + r$, $r = 0, 1, \ldots, R-1$, $c = 0, 1, \ldots, C-1$, $C = \lceil N^{CORESET}/(LR) \rceil$, c refers to a row coordinate of an interleaving matrix corresponding to the function, r refers to a column coordinate of the interleaving matrix, $N^{CORESET}$ refers to an actual quantity of physical resource elements, L refers to a quantity of physical resource elements included in one physical resource element bundle, R refers to a first preset parameter, $n_{shift}$ refers to a second preset parameter, and mod represents an operation for taking a remainder; and the invalid marking module is further configured to, in response to that f(j) is greater than $N^{CORESET}/L - 1$, mark f(j) as invalid.

In some embodiments, the correspondence determining module is further configured to determine the first correspondence $g(m) = f(j)$ between an actual sequence number m and a virtual sequence number j, wherein in response to that f(j) is valid, $g(m) = f(j)$ is marked, and in response to that f(j) is invalid, a value of j is increased until f(j) is valid, and $g(m) = f(j)$ is marked.

In some embodiments, the mapping determining module includes:

a correspondence determining submodule configured to determine, based on an order of the actual sequence numbers and a quantity of physical resource element bundles comprised in one logical resource element, the second correspondence between a logical resource element and an actual sequence number; and a mapping determining submodule configured to determine the mapping relationship between the logical resource elements and the actual physical resource element bundles based on the first correspondence and the second correspondence.

According to a third aspect of examples of the present disclosure, an electronic device is provided, the device includes:

a processor, and a memory for storing instructions executable by the processor;

wherein, the processor is configured to execute the steps in the method described in any of the foregoing examples.

According to a fourth aspect of the examples of the present disclosure, a computer-readable storage medium is provided, the storage medium stores a computer program, and when the program is executed by a processor, the steps in the method described in any of the foregoing examples are implemented.

It should be understood that the above general description and the following detailed description are merely exemplary and explanatory and are not intended to limit the disclosure.

BRIEF DESCRIPTION OF THE DRAWINGS

The accompanying drawings, which are incorporated in and constitute a part of this disclosure, illustrate examples consistent with the present disclosure and, together with the description, serve to explain principles of some embodiments of the disclosure.

FIG. 3 is a schematic flowchart illustrating a process of determining a first correspondence of the valid physical resource element bundles in the interleaved first physical resource element bundles with respect to an actual sequence of the actual physical resource element bundles according to an example of the present disclosure.

FIG. 4 is schematic flowchart illustrating a process of determining a mapping relationship between logical resource elements and actual physical resource element bundles based on the first correspondence and a second correspondence of the logical resource elements with respect to the actual sequence according to an example of the present disclosure.

FIG. 5 is a schematic diagram illustrating a logical resource element according to an example of the present disclosure.

DETAILED DESCRIPTION

Figure 1:
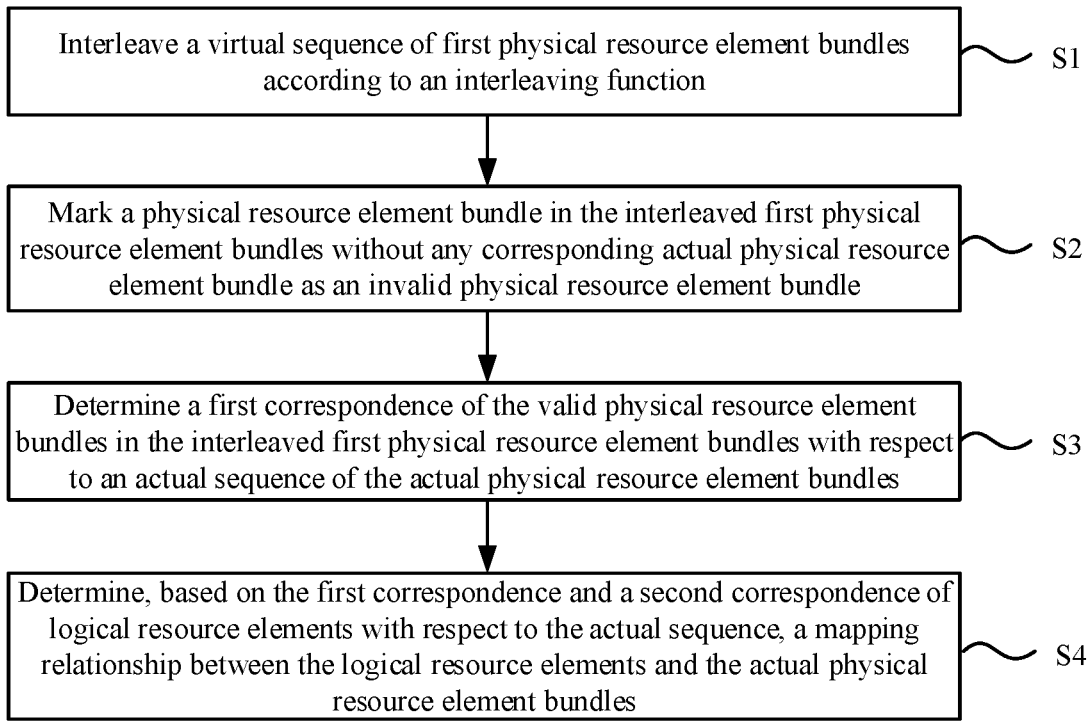
FIG. 1 is a schematic flowchart illustrating an interleaved mapping method according to an example of the present disclosure.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

For example, a logical resource element corresponds to a physical resource element bundle including one or more physical resource elements. In the related art, an interleaving is performed by a function as follows:

$$f(j)=(rC+c+n_{shift}) \mod(N^{CORESET}/L),$$

$$C=\lceil N^{CORESET}/(LR)\rceil,$$

where j refers to a sequence number of the physical resource element bundle, c refers to a row coordinate of an interleaving matrix corresponding to the function, r refers to a column coordinate of the interleaving matrix, $N^{CORESET}$ refers to an actual quantity of physical resource elements, L refers to a quantity of physical resource elements included in one physical resource element bundle, R and $n_{shift}$ refer to preset parameters, and mod represents an operation for taking a remainder.

According to a manner in the related art, in some cases, one physical resource element bundle may correspond to multiple logical resource elements. In this way, a mapping result obtained based on such kind of correspondence is unreasonable, which may cause a problem during resource transmission.

For example, assuming $N^{CORESET}$=48, L=6, R=6, then C=$\lceil N^{CORESET}/(LR)\rceil$=2 can be obtained, and the values of c are 0 and 1. Assuming quantity of physical resource elements corresponding to each logical resource element is N=6, then a quantity of physical resource element bundles corresponding to each logical resource element is 6/6=1.

When c=0, a value range of j is 0 to 5, and a sequence number of an interleaved physical resource element bundle can be obtained as: f(0)=0; f(1)=2; f(2)=4; f(3)=6; f(4)=0; and f(5)=2. When c=1, the value range of j is 6 and 7, and a sequence number of an interleaved physical resource element bundle can be obtained as: f(6)=1 and f(7)=3.

Since each logical resource element corresponds to one physical resource element bundle, it can be concluded from the above results that the zeroth logical resource element corresponds to the zeroth physical resource element bundle, the first logical resource element corresponds to the second physical resource element bundle, the second logical resource element corresponds to the fourth physical resource element bundle, the third logical resource element corresponds to the sixth physical resource element bundle, the fourth logical resource element corresponds to the zeroth physical resource element bundle, the fifth logical resource element corresponds to the second physical resource element bundle, the sixth logical resource element corresponds to the first physical resource element bundle, and the seventh logical resource element corresponds to the third physical resource element bundle. It can be seen that the zeroth physical resource element bundle corresponds to two logical resource elements, and the second physical resource element bundle corresponds to two logical resource elements. Further, the fifth and seventh physical resource element bundle do not correspond to any logical resource element.

To avoid the above situation, a method adopted in the related art is to limit the value of C to be an integer, i.e., $N^{CORESET}$ is an integer multiple of L×R. However, due to the limit to the value of C, the flexibility of resource configuration is relatively decreased.

FIG. 1 is a schematic flowchart illustrating an interleaved mapping method according to an example of the present disclosure. The interleaved mapping method shown in the example can be applicable to user equipment, such as a mobile phone, a tablet computer, and so on, and can also be applicable to a base station, such as a 4G base stations, a 5G base station, and so on.

As shown in FIG. 1, the interleaved mapping method can include the following steps.

At step S1, a virtual sequence of first physical resource element bundles is interleaved according to an interleaving function. The first physical resource element bundles include actual physical resource element bundles and one or more virtual physical resource element bundles.

In an example, the virtual sequence refers to that the first physical resource element bundles are sorted according to a preset mode (for example, sorting according to positions in the time domain first, and then sorting according to positions in the frequency domain; or sorting according to positions in the frequency domain first, and then sorting according to positions in the time domain), and a total quantity of the sorted first physical resource element bundles may be greater than an actual quantity of actual physical resource element bundles, where a first physical resource element bundle with a sequence number greater than the actual quantity of physical resource element bundles belongs to a virtual physical resource element bundle.

Interleaving the virtual sequence refers to reordering the virtual sequence according to the interleaving function. For example, substituting a virtual sequence number of the virtual sequence into the interleaving function can obtain a reordered interleaving sequence number.

It should be noted that, in the examples of the present disclosure, the actual quantity of the actual physical resource element bundles refers to a quantity of physical resource element bundles in physical resource elements which are allocated for a channel by a communication system. For example, assuming $N^{CORESET}$=48 and L=6, then the actual quantity of the actual physical resource element bundles is 8.

At step S2, a physical resource element bundle in the interleaved first physical resource element bundles without any corresponding actual physical resource element bundle is marked as an invalid physical resource element bundle.

In an example, since a first physical resource element bundle with a sequence number greater than the actual quantity of the actual physical resource element bundles belongs to a virtual physical resource element bundle, after the virtual sequence is interleaved according to the interleaving function, one or more invalid physical resource element bundles still exist in the interleaved first physical resource element bundles. For example, interleaving sequence numbers of the interleaved first physical resource element bundles can be determined, and a physical resource element bundle corresponding to an interleaving sequence number greater than the actual quantity of the actual physical resource element bundles can be marked as the invalid physical resource element bundle.

At step S3, a first correspondence of the valid physical resource element bundles in the interleaved first physical resource element bundles with respect to an actual sequence of the actual physical resource element bundles is determined.

In an example, the virtual sequence numbers corresponding to the valid physical resource element bundles in the interleaved first physical resource element bundles are different, and the valid physical resource element bundles can be further processed according to the virtual sequence number from small to large, so as to obtain the actual sequence of the actual physical resource element bundles. An actual sequence number of the actual sequence and an interleaving sequence number of the valid physical resource element bundles can represent the first correspondence of the valid physical resource element bundles in the interleaved first physical resource element bundles with respect to the actual sequence.

At step S4, a mapping relationship between logical resource elements and the actual physical resource element bundles is determined based on the first correspondence and a second correspondence of the logical resource elements with respect to the actual sequence.

In an example, based on a quantity of physical resource elements included in one logical resource element and a quantity of physical resource elements included in one physical resource element bundle, a quantity of physical resource element bundles included in one logical resource element can be determined. That is, a quantity of physical resource element bundles corresponding to each logical resource element can be determined. For example, each logical resource element corresponds to two physical resource element bundles, then the second correspondence is that each logical resource element corresponds to two actual sequence numbers in the actual sequence.

Since the first correspondence can represent a relationship between the actual sequence and the valid physical resource element bundles in the interleaved first physical resource element bundles, and the second correspondence can represent a relationship between the actual sequence and the logical resource elements, according to the first correspondence and the second correspondence, the mapping relationship between the logical resource elements and the valid physical resource element bundles, i.e., the actual physical resource element bundles, can be determined.

The first physical resource element bundles are interleaved, and then the physical resource element bundle in the interleaved first physical resource element bundles not corresponding to any actual physical resource element bundle is marked as invalid. In the process of establishing the mapping relationship between a logical resource element and an actual physical resource element bundle, it can avoid the logical resource element mapping to a physical resource element bundle with an invalid sequence number, and different logical resource elements will not be mapped to the same physical resource element, thereby ensuring the reasonability of the mapping relationship, and ensuring that resource transmission will not be problematic. Furthermore, a value of a parameter in the interleaving function is not limited, thereby ensuring high flexibility in resource configuration.

Figure 2:
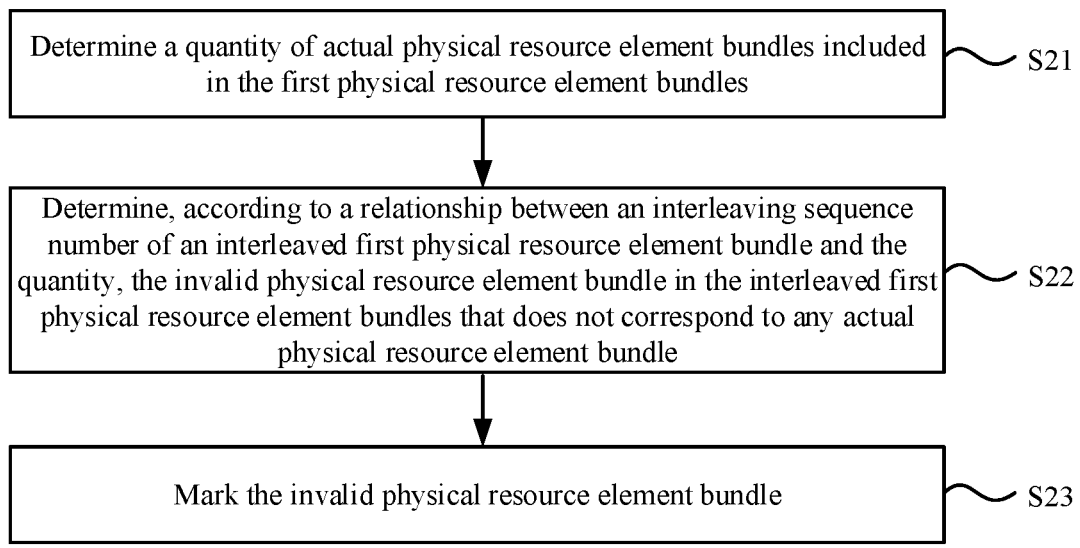
FIG. 2 is a schematic flowchart illustrating a process of marking a physical resource element bundle in the interleaved first physical resource element bundles without any corresponding actual physical resource element bundle as an invalid physical resource element bundle according to an example of the present disclosure.

FIG. 2 is a schematic flowchart illustrating a process of marking a physical resource element bundle in the interleaved first physical resource element bundles without any corresponding actual physical resource element bundle as an invalid physical resource element bundle according to an example of the present disclosure. As shown in FIG. 2, marking the physical resource element bundle in the interleaved first physical resource element bundles without any corresponding actual physical resource element bundle as the invalid physical resource element bundle includes the followings.

At step S21, a quantity of actual physical resource element bundles included in the first resource element bundles is determined.

At step S22, according to a relationship between an interleaving sequence number of an interleaved physical resource element bundle and the quantity, the invalid physical resource element bundle in the interleaved first physical resource element bundles that does not correspond to any actual physical resource element bundle is determined.

At step S23, the invalid physical resource element bundle is marked.

In an example, in an interleaving function, the virtual sequence number of the virtual sequence can be obtained through a specific operation, and this operation may include a rounding (for example, rounding up) operation. Since a value obtained by the rounding operation may not equal to an unrounded value, it may cause a value range of the virtual sequence number may be different from a value range of the actual sequence number, such that the virtual sequence number may be greater than the actual quantity of the actual physical resource element bundles. A physical resource element bundle with a virtual sequence number greater than the actual quantity of the actual physical resource element bundles, i.e., a virtual physical resource element bundle, does not actually exist, so such physical resource element bundle can be taken as a virtual physical resource element bundle. Assuming $N^{CORESET}=48$, and L=6, R=6, then $C=\lceil N^{CORESET}/(LR)\rceil=2$ can be obtained. In this case, the value range of the virtual sequence number may be from 0 to 11, while the actual quantity of the actual physical resource element bundles is 8. Thus, a physical resource element bundle with a virtual sequence number from 8 to 11 can be taken as the virtual physical resource element bundle.

In some embodiments, the interleaving function can be $f(j)=(rC+c+n_{shift})\mod(CR)$.

Where, j represents a virtual sequence number of the virtual sequence, f(j) refers to an interleaving sequence number after interleaving the virtual sequence number, j=cR+r, r=0, 1, ..., R−1, c=0, 1, ..., C−1, $C=\lceil N^{CORESET}/(LR)\rceil$, c refers to a row coordinate of an interleaving matrix corresponding to the function, r refers to a column coordinate of the interleaving matrix, $N^{CORESET}$ refers to an actual quantity of physical resource elements, L refers to a quantity of physical resource elements included in one physical resource element bundle, R refers to a first preset parameter, $n_{shift}$ refers to a second preset parameter, mod represents an operation for taking a remainder.

Marking the invalid physical resource element bundle in the interleaved first physical resource element bundles that does not correspond to any actual physical resource element bundle includes:

if f(j) is greater than $N^{CORESET}/L-1$, f(j) is marked as invalid.

If f(j) is less than or equal to $N^{CORESET}/L-1$, f(j) is taken as a valid physical resource element bundle.

In an example, $N^{CORESET}$ refers to the actual quantity of physical resource elements, and each physical resource element bundle includes L physical resource elements, then $N^{CORESET}/L$ refers to the actual quantity of actual physical resource element bundles. If the interleaving sequence number f(j) and a sequence number of the actual physical resource element bundles start from 0, the maximum sequence number of the actual physical resource element bundles is $N^{CORESET}/L-1$. That is, when f(j) corresponds to a physical resource element bundle with a sequence number greater than $N^{CORESET}/L-1$, such kind of f(j) is an invalid physical resource element bundle, which can be marked as invalid.

FIG. 3 is a schematic flowchart illustrating a process of determining a first correspondence of the valid physical resource element bundles in the interleaved first physical resource element bundles with respect to an actual sequence of the actual physical resource element bundles according to an example of the present disclosure. As shown in FIG. 3, determining the first correspondence between the actual sequence of the actual physical resource element bundles and the valid physical resource element bundles in the interleaved first physical resource element bundles includes the followings.

At step S31, a first correspondence g(m)=f(j) between an actual sequence number m and a virtual sequence number j is determined, where, if f(j) is valid, mark g(m)=f(j), and if f(j) is invalid, a value of j is increased until f(j) is valid, mark g(m)=f(j).

In an example, by determining the first correspondence between the actual sequence number and the virtual sequence number, the interleaving sequence number f(j) corresponding to a valid physical resource element may be sorted according to a change order of the actual sequence numbers m from small to large, so as to determine a relationship between a logical resource element and the interleaving sequence number f(j) according to a relationship between the logical resource element and the actual sequence number. Further, a mapping relationship between the logical resource element and a valid physical resource element bundle corresponding to the interleaving sequence number f(j), i.e., an actual physical resource element bundle, is determined based on the relationship between the logical resource element and the interleaving sequence number f(j).

FIG. 4 is schematic flowchart illustrating a process of determining a mapping relationship between logical resource elements and actual physical resource element bundles based on the first correspondence and a second correspondence of the logical resource elements with respect to the actual sequence according to an example of the present disclosure. As shown in FIG. 4, determining the mapping relationship between the logical resource elements and the actual physical resource element bundles based on the first correspondence and the second correspondence between the logical resource elements and the actual sequence includes the followings.

At step S41, the second correspondence between a logical resource element and an actual sequence number is determined based on an order of the actual sequence numbers and a quantity of physical resource element bundles included in one logical resource element.

At step S42, the mapping relationship between the logical resource elements and the valid physical resource element bundles is determined based on the first correspondence and the second correspondence.

In an example, each step in the foregoing example may be described by using codes as followings:

```
%%
for c=0:C-1
    for r=0:R-1
        j=cR+r;
        f(j)=(r*C+c) mod (C*R)
        if f(j) > N^CORESET / L - 1
            f(j)=NULL;
        end
    end
end
%% delete portion of NULL
m=0;
for j=0: C*R-1
    if f(j)!=NULL & m< N^CORESET / L - 1
        g(m)=f(j)
        m++;
    end
end
%%
```

NULL refers to invalid. The virtual sequence number and the actual sequence number only indicate an order (physical resource element bundles can be sorted in a preset manner, for example, sorted according to an order of symbols in the time domain corresponding to the physical resource element bundles), the virtual sequence number j refers to a sequence number of the first physical resource element bundles before interleaving. And the so-called virtual means that the maximum value of j may be greater than the actual quantity of the actual physical resource element bundles. The actual sequence number m refers to a sequence number of an actual physical resource element bundle mapped with a logical resource element.

The interleaved mapping method described in the foregoing examples will be exemplarily described in the following two examples.

In an example, for example, assuming that $N^{CORESET}=48$, $L=6$, $R=6$, and the quantity N of physical resource elements corresponding to each logical resource element equals 6, then $C=\lceil N^{CORESET}/(LR) \rceil=2$, the value range of j is 0 to 11. Then f(j) can be calculated as $f(j)=(rC+c+n_{shift})\mod(CR)$, and codes show as followings:

```
for c=0:1
    for r=0:5
        j=cR+r;
        f(j)=(r*C+c) mod (C*R)
    end
end
```

Next an invalid f(j) can be determined, and codes show as followings:

```
if f(j) > N^CORESET / L - 1
    f(j)=NULL;
end
```

Thus, it can be obtained that f(0)=0; f(1)=2; f(2)=4; f(3)=6; f(4)=NULL; f(5)=NULL; f(6)=1; f(7)=3; f(8)=5; f(9)=7; f(8)=NULL; f(9)=NULL; f(10)=NULL; and f(11)=NULL.

Then the first corresponding relationship between an actual sequence number m and a virtual sequence number j can be determined. The value range of m is from 0 to $N^{CORESET}/L-1$, and codes show as followings:

```
m=0;
for j=0: C*R-1
    if f(j)!=NULL & m< N^CORESET / L - 1
        g(m)=f(j)
        m++;
    end
end
```

It can be obtained that g(0)=0; g(1)=2; g(2)=4; g(3)=6; g(4)=1; g(5)=3; g(6)=5; g(7)=7. That is, the actual sequence number 0 corresponds to the zeroth physical resource element bundle, the actual sequence number 1 corresponds to the second physical resource element bundle, the actual sequence number 2 corresponds to the fourth physical resource element bundle, the actual sequence number 3 corresponds to the sixth physical resource element bundle, the actual sequence number 4 corresponds to the first physical resource element bundle, the actual sequence number 5 corresponds to the third physical resource element bundle, the actual sequence number 6 corresponds to the fifth physical resource element bundle, and the actual sequence number 7 corresponds to the seventh physical resource element bundle. These physical resource element bundles are all actual physical resource element bundles.

Since the number of physical resource element bundles corresponding to each logical resource element is N/L=1, the zeroth logical resource element corresponds to the zeroth physical resource element bundle, the first logical resource element corresponds to the second physical resource element bundle, the second logical resource element corresponds to the fourth physical resource element bundle, the third logical resource element corresponds to the sixth physical resource element bundle, the fourth logical resource element corresponds to the first physical resource element bundle, the fifth logical resource element corresponds to the third physical resource element bundle, the sixth logical resource element corresponds to the fifth physical resource element bundle, and the seventh logical resource element corresponds to the seventh physical resource element bundle. These physical resource element bundles are all actual physical resource element bundles.

Thus, on the basis of establishing the mapping relationship between the logical resource element and the physical resource element bundle, it is ensured that different logical resource elements will not be mapped to the same physical resource element.

In an example, for example, assuming that $N^{CORESET}=48$, L=3, R=6, and the quantity N of physical resource elements corresponding to each logical resource element equals 6, then $C=\lceil N^{CORESET}/(LR)\rceil=3$, the value range of j is 0 to 17. Then f (j) can be calculated as $f(j)=(rC+c+n_{shift})\bmod(CR)$, and codes show as followings:

```
for c=0:2
  for r=0:5
    j=cR+r;
    f(j)=(r*C+c) mod (C*R)
  end
end
```

Next an invalid f(j) can be determined, and codes show as followings:

```
if f(j)> N^{CORESET} / L − 1
  f(j)=NULL;
end
```

Thus, it can be obtained that f(0)=0; f(1)=3; f(2)=6; f(3)=9; f(4)=12; 45)=15; f(6)=1; f(7)=4; f(8)=7; f(9)=10; f(10)=13; f(11)=NULL; f(12)=2; f(13)=5; f(14)=8; f(15)=11; f(16)=14; and f(17)=NULL.

Then the first corresponding relationship between an actual sequence number m and a virtual sequence number j can be determined. The value range of m is from 0 to $N^{CORESET}/L-1$, and codes show as followings:

```
m=0;
for j=0: C*R-1
  if f(j)!=NULL & n< N^{CORESET} / L − 1
    g(m)=f(j)
    m++;
  end
end
```

It can be obtained that g(0)=0; g(1)=3; g(2)=6; g(3)=9; g(4)=12; g(5)=15; g(6)=1; g(7)=4; g(8)=7; g(9)=10; g(10)=13; g(11)=2; g(12)=5; g(13)=8; g(14)=11; and g(15)=14. That is, the actual sequence number 0 corresponds to the zeroth physical resource element bundle, the actual sequence number 1 corresponds to the third physical resource element bundle, the actual sequence number 2 corresponds to the sixth physical resource element bundle, the actual sequence number 3 corresponds to the ninth physical resource element bundle, the actual sequence number 4 corresponds to the twelfth physical resource element bundle, the actual sequence number 5 corresponds to the fifteenth physical resource element bundle, the actual sequence number 6 corresponds to the first physical resource element bundle, the actual sequence number 7 corresponds to the fourth physical resource element bundle, the actual sequence number 8 corresponds to the seventh physical resource element bundle, the actual sequence number 9 corresponds to the tenth physical resource element bundle, the actual sequence number 10 corresponds to the thirteenth physical resource element bundle, the actual sequence number 11 corresponds to the second physical resource element bundle, the actual sequence number 12 corresponds to the fifth physical resource element bundle, the actual sequence number 13 corresponds to the eighth physical resource element bundle, the actual sequence number 14 corresponds to the eleventh physical resource element bundle, and the actual sequence number 15 corresponds to the fourteenth physical resource element bundle. These physical resource element bundles are all actual physical resource element bundles.

Since the quantity of physical resource element bundles corresponding to each logical resource element is N/L=2, the zeroth logical resource element corresponds to the zeroth physical resource element bundle and the third physical resource element bundle, the first logical resource element corresponds to the sixth physical resource element bundle and the ninth physical resource element bundle, the second logical resource element corresponds to the twelfth physical resource element bundle and the fifteenth physical resource element bundle, the third logical resource element corresponds to the first physical resource element bundle and the fourth physical resource element bundle, the fourth logical resource element corresponds to the seventh physical resource element bundle and the tenth physical resource element bundle, the fifth logical resource element corresponds to the thirteenth physical resource element bundle and the second physical resource element bundle, the sixth logical resource element corresponds to the fifth physical resource element bundle and the eighth physical resource element bundle, and the seventh logical resource element corresponds to the eleventh physical resource element bundle and the fourteenth physical resource element bundle. These physical resource element bundles are all actual physical resource element bundles.

Thus, on the basis of establishing the mapping relationship between the logical resource element and the physical resource element bundle, it is ensured that different logical resource elements will not be mapped to the same physical resource element.

According to examples of the present disclosure, the first physical resource element bundles are interleaved, and then the physical resource element bundle in the interleaved first physical resource element bundles not corresponding to any actual physical resource element bundle is marked as invalid. In the process of establishing the mapping relationship between a logical resource element and an actual physical resource element bundle, it can avoid the logical resource element mapping to a physical resource element bundle with an invalid sequence number, and different logical resource elements will not be mapped to the same physical resource element, thereby ensuring the reasonability of the mapping relationship, and ensuring that resource transmission will not be problematic. Furthermore, a value of a parameter in the interleaving function is not limited, thereby ensuring high flexibility in resource configuration.

In some embodiments, the physical resource element may be a Resource Element Group (REG).

In some embodiments, the logical resource element may be a Control Channel Element (CCE).

It should be noted that, in addition to a REG, it may also select other contents as the physical resource element according to needs. It should be noted that, in addition to a CCE, it may also select other contents as the logical resource element according to needs.

FIG. 5 is a schematic diagram illustrating a logic resource element according to an example of the present disclosure.

As shown in FIG. 5, taking the physical resource element as the REG and the logical resource element as the CCE as an example. If one symbol in the time domain corresponds to 3 REGs, and one CCE corresponds to 6 REGs, one CCE can correspond to REGs corresponding to symbols in the time domain, which are symbol 0 and symbol 1, that is, 3 REGs corresponding to each time domain symbol, and 6 REGs in total.

Corresponding to the foregoing examples of the interleaved mapping method, the present disclosure also provides examples of interleaved mapping apparatuses.

Figure 6:
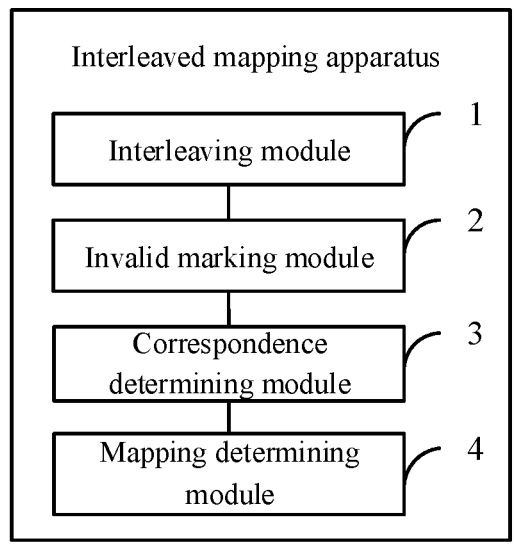
FIG. 6 is a schematic block diagram illustrating an interleaved mapping apparatus according to an example of the present disclosure.

FIG. 6 is a schematic block diagram illustrating an interleaved mapping apparatus according to an example of the present disclosure. The interleaved mapping apparatus shown in this example can be applicable to user equipment, such as a mobile phone, a tablet computer, etc., and can also be applicable to a base station, such as a 4G base station, a 5G base station, and so on.

As shown in FIG. 6, the interleaved mapping apparatus may include the followings.

An interleaving module 1 is configured to interleave a virtual sequence of first physical resource element bundles according to an interleaving function, wherein the first physical resource element bundles comprise actual physical resource element bundles and one or more virtual physical resource element bundles.

An invalid marking module 2 is configured to mark a physical resource element bundle in the interleaved first physical resource element bundles without any corresponding actual physical resource element bundle as an invalid physical resource element bundle.

A correspondence determining module 3 is configured to determine a first correspondence of the valid physical resource element bundles in the interleaved first physical resource element bundles with respect to an actual sequence of the actual physical resource element bundles.

A mapping determining module 4 is configured to determine, based on the first correspondence and a second correspondence of logical resource elements with respect to the actual sequence, a mapping relationship between the logical resource elements and the actual physical resource element bundles.

Figure 7:
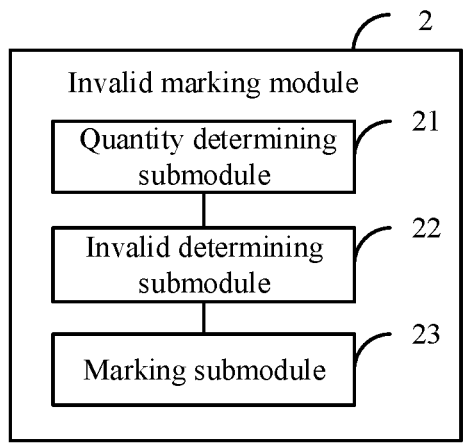
FIG. 7 is a schematic block diagram illustrating an invalid marking module according to an example of the present disclosure.

FIG. 7 is a schematic block diagram illustrating an invalid marking module according to an example of the present disclosure. As shown in FIG. 7, the invalid marking module 2 includes the followings.

A quantity determining submodule 21 is configured to determine a quantity of actual physical resource element bundles comprised in the first physical resource element bundles.

An invalid determining submodule 22 is configured to determine, according to a relationship between an interleaving sequence number of an interleaved first physical resource element bundle and the quantity, the invalid physical resource element bundle in the interleaved first physical resource element bundles that does not correspond to any actual physical resource element bundle.

A marking submodule 23 is configured to mark the invalid physical resource element bundle.

In some embodiments, the interleaving function is:

$$f(j)=(rC+c+n_{shift})\mod(CR);$$

where, j represents a virtual sequence number of the virtual sequence, f(j) refers to an interleaving sequence number after interleaving the virtual sequence number, j=cR+r, r=0, 1, ..., R−1, c=0, 1, ..., C−1, C=⌈$N^{CORESET}$/(LR)⌉, c refers to a row coordinate of an interleaving matrix corresponding to the function, r refers to a column coordinate of the interleaving matrix, $N^{CORESET}$ refers to an actual quantity of physical resource elements, L refers to a quantity of physical resource elements included in one physical resource element bundle, R refers to a first preset parameter, $n_{shift}$ refers to a second preset parameter, and mod represents an operation for taking a remainder.

The invalid marking module is further configured to, in response to that f(j) is greater than $N^{CORESET}$/L−1, mark f(j) as invalid.

In some embodiments, the correspondence determining module is further configured to determine the first correspondence g(m)=f(j) between an actual sequence number m and the virtual sequence number j, where in response to that f(j) is valid, g(m)=f(j) is marked, and in response to that f(j) is invalid, a value of j is increased until f(j) is valid, and g(m)=f(j) is marked.

Figure 8:
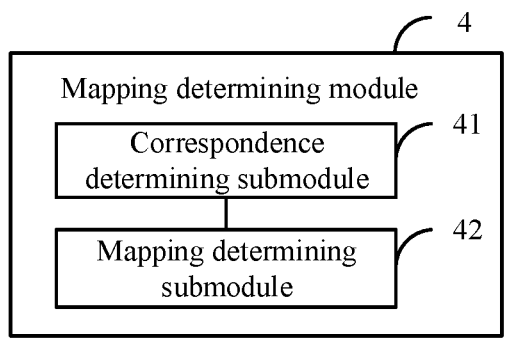
FIG. 8 is a schematic block diagram illustrating a mapping determining module according to an example of the present disclosure.

FIG. 8 is a schematic block diagram illustrating a mapping determining module according to an example of the present disclosure. As shown in FIG. 8, the mapping determining module 4 includes the followings.

A correspondence determining submodule 41 is configured to determine, based on an order of the actual sequence numbers and a quantity of physical resource element bundles comprised in one logical resource element, the second correspondence between a logical resource element and an actual sequence number.

A mapping determining submodule 42 is configured to determine the mapping relationship between the logical resource elements and the actual physical resource element bundles based on the first correspondence and the second correspondence.

Regarding the apparatuses in the foregoing examples, the specific manner in which each module performs operations has been described in detail in the examples of the related methods, and will not be described in detail herein.

Since the apparatus examples substantially correspond to the method examples, a reference may be made to part of the descriptions of the method examples for the related part. The apparatus examples described above are merely illustrative, where the units described as separate members may be or not be physically separated, and the members displayed as units may be or not be physical units, e.g., may be located in one place, or may be distributed to a plurality of network units. Part or all of the modules may be selected according to actual requirements to implement the objectives of the solutions in the examples. Those of ordinary skill in the art may understand and carry out them without creative work.

An example of the present disclosure also provides an electronic device, including:

a processor, and memory for storing instructions executable by the processor;

where, the processor is configured to execute the steps in the interleaved mapping method described in any one of the foregoing examples.

An example of the present disclosure also provides a computer-readable storage medium on which a computer program is stored, and when the program is executed by a processor, the steps in the interleaved mapping method described in any one of the foregoing examples are implemented.

Figure 9:
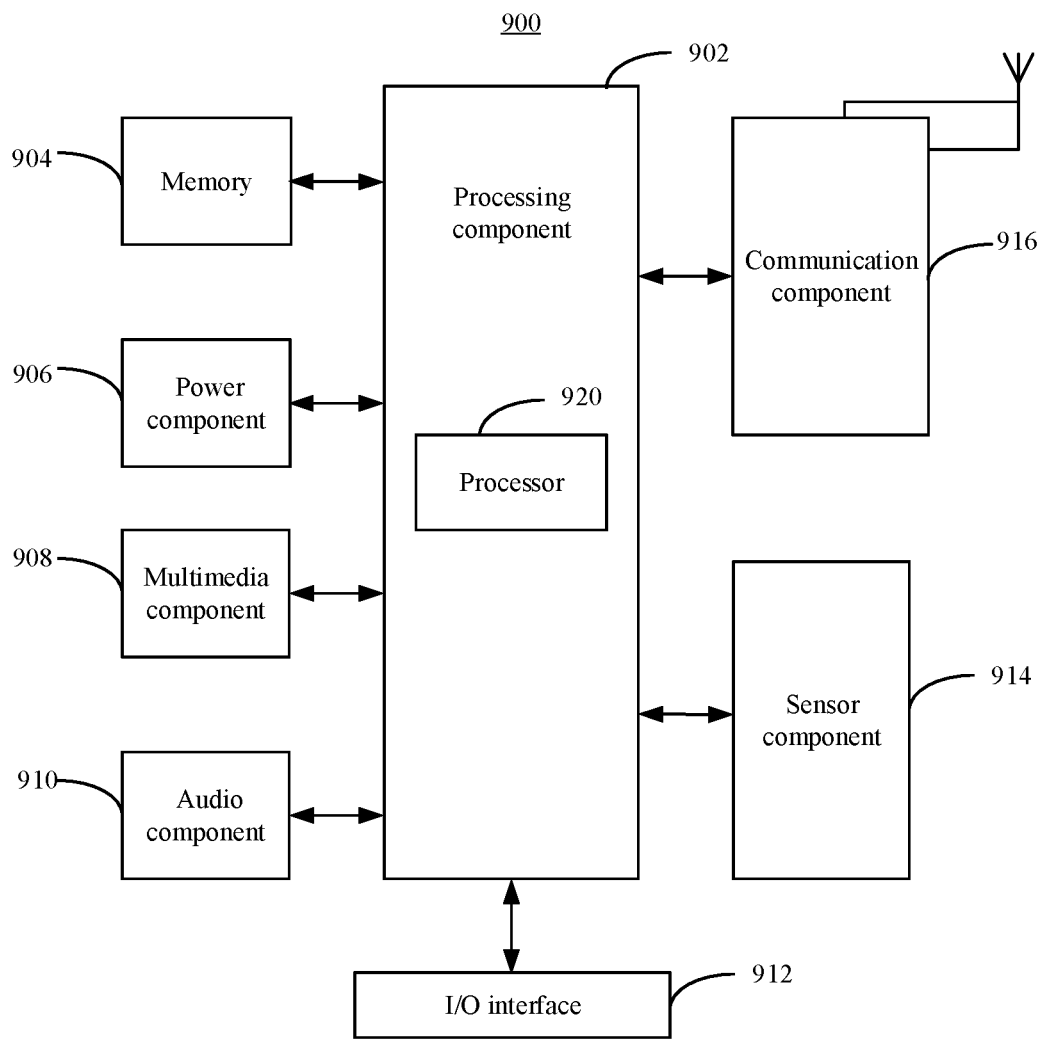
FIG. 9 is a schematic block diagram illustrating an apparatus for interleaved mapping according to an example of the present disclosure.

FIG. 9 is a schematic block diagram illustrating an apparatus 900 for interleaved mapping according to an example. For example, the apparatus 900 may be a mobile phone, a computer, a digital broadcast terminal, a messaging device, a game console, a tablet device, a medical equipment, a fitness equipment, a personal digital assistant, or the like.

Referring to FIG. 9, the apparatus 900 may include one or more of the following components: a processing component 902, a memory 904, a power component 906, a multimedia component 908, an audio component 910, an input/output (I/O) interface 912, a sensor component 914, and a communication component 916.

The processing component 902 usually controls overall operations of the apparatus 900, such as operations associated with display, telephone calls, data communications, camera operations, and recording operations. The processing component 902 may include one or more processors 920 to execute instructions to perform all or part of the steps in the methods described above. Moreover, the processing component 902 may include one or more modules to facilitate interaction among the processing component 902 and other components. For example, the processing component 902 may include a multimedia module to facilitate interaction between the multimedia component 908 and the processing component 902.

The memory 904 is configured to store various types of data to support operations at the apparatus 900. Examples of these data include instructions for any application or method operating at the apparatus 900, contact data, phone book data, messages, pictures, videos, and the like. The memory 904 may be implemented by any type of volatile or nonvolatile storage device or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic disk or a compact disk.

The power component 906 provides power to various components of the apparatus 900. The power component 906 may include a power management system, one or more power supplies, and other components associated with power generated, managed, and distributed for the apparatus 900.

The multimedia component 908 includes a screen that provides an output interface between the apparatus 900 and a user. In some examples, the screen may include a liquid crystal display (LCD) and a touch panel (TP). In some embodiments, organic light-emitting diode (OLED) or other types of displays can be employed.

If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some examples, the multimedia component 908 includes a front camera and/or a rear camera. When the apparatus 900 is in an operation mode, such as a shooting mode or a video mode, the front camera and/or the rear camera may receive external multimedia data. Each of the front and rear cameras may be a fixed optical lens system or have a focal length and optical zoom capability.

The audio component 910 is configured to output and/or input audio signals. For example, the audio component 910 includes a microphone (MIC) configured to receive external audio signals when the apparatus 900 is in an operation mode, such as a call mode, a recording mode, and a voice recognition mode. The received audio signals may be further stored in the memory 904 or transmitted via the communication component 916. In some examples, the audio component 910 also includes a loudspeaker for outputting audio signals.

The I/O interface 912 provides an interface between the processing component 902 and a peripheral interface module which may be a keyboard, a click wheel, a button, or the like. These buttons may include, but are not limited to a home button, a volume button, a start button, and a lock button.

The sensor component 914 includes one or more sensors for providing a status assessment in various aspects to the apparatus 900. For example, the sensor component 914 may detect an open/closed state of the apparatus 900, and the relative positioning of components, which are, for example, a display and a keypad of the apparatus 900. The sensor component 914 may also detect a change in position of the apparatus 900 or a component of the apparatus 900, the presence or absence of a user in contact with the apparatus 900, the orientation or acceleration/deceleration of the apparatus 900 and a change in temperature of the apparatus 900. The sensor component 914 may include a proximity sensor configured to detect the presence of nearby objects without any physical contact. The sensor component 914 may also include a light sensor, such as a CMOS or CCD image sensor, for use in imaging applications. In some examples, the sensor component 914 may also include an acceleration sensor, a gyro sensor, a magnetic sensor, a pressure sensor, or a temperature sensor.

The communication component 916 is configured to facilitate wired or wireless communication between the apparatus 900 and other devices. The apparatus 900 may access a wireless network based on a communication standard, such as Wi-Fi, 2G, 3G, 4G, or 5G, or a combination thereof. In an example, the communication component 916 receives broadcast signals or broadcast associated information from an external broadcast management system via a broadcast channel. In an example, the communication component 916 also includes a near field communication (NFC) module to facilitate short range communication. For example, the NFC module may be implemented based on a radio frequency identification (RFID) technology, an infrared data association (IrDA) technology, an ultra-wide band (UWB) technology, a Bluetooth (BT) technology, and other technologies.

In an example, the apparatus 900 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic elements for performing the above methods.

In an example, there is also provided a non-transitory computer readable storage medium including instructions, such as the memory 904 including instructions, where the instructions are executable by the processor 920 of the apparatus 900 to perform the method as described above. For example, the non-transitory computer readable storage medium may be a ROM, a random-access memory (RAM), a CD-ROM, a magnetic tape, a floppy disk, and an optical data storage device.

Various embodiments of the present disclosure can have one or more of the following advantages.

The first physical resource element bundles are interleaved, and then the physical resource element bundle in the interleaved first physical resource element bundles not corresponding to any actual physical resource element bundle is marked as invalid. In the process of establishing the mapping relationship between a logical resource element and an actual physical resource element bundle, it can avoid the logical resource element mapping to a physical resource element bundle with an invalid sequence number, and different logical resource elements will not be mapped to the same physical resource element, thereby ensuring the reasonability of the mapping relationship, and ensuring that resource transmission will not be problematic. Furthermore, a value of a parameter in the interleaving function is not limited, thereby ensuring high flexibility in resource configuration.

In an example, a physical downlink control channel (PDCCH) typically carries downlink control information, such as uplink grant information, downlink data transmission indication, common control information, etc., from a base station to UE. The REG typically contains a number of resource elements. The CCE can be the basic resource allocation unit for the PDCCH and mapped to a number of REGs. The base station can transmit the PDCCH via a control resource set (CORESET), where the CORESET can be a set of time/frequency resources and parameters used to carry PDCCH and include a number of REGs (e.g., physical resource elements) that are mapped to the CCE (e.g., logical resource elements). When transmitting the PDCCH, a physical layer (e.g., CORESET/REG) is involved, to which contents from a logical layer (e.g., CCE) are mapped.

In the design of the new generation communication system, the CORESET can be the resource location where the control channel transmission is located. The base station indicates the configuration of CORESET and the occurrence of control signaling detection to the terminal (e.g., UE) through signaling, and the terminal can know where it needs to detect the control channel.

A CCE can contains 6 consecutive REGs, for example, and one or more CCEs can be included in the CORESET. The total number of REGs (RB) contained in the CORESET can be $N_{RB}^{CORESET} * N_{symb}^{CORESET}$.

To increase diversity gain and interference randomization, when performing a one-to-one correspondence between logical resource units CCEs and physical resource units, the order of physical resource units can be interleaved first, and then the mapping between CCEs and physical resources can be performed. The physical resource interleaving mapping can be performed with a REG bundle as the basic unit, which can be composed of one or more consecutive REGs.

The various device components, portions, units, modules, circuits, blocks, or portions may have modular configurations, or are composed of discrete components, but nonetheless can be referred to as "modules" or "portions" in general. In other words, the "components," "portions," "units," "modules," "circuits," "blocks," or "portions" referred to herein may or may not be in modular forms, and these phrases may be interchangeably used.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

In some embodiments, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a mark-up language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

What is claimed is:

1. An interleaved mapping method, comprising:
   interleaving a virtual sequence of first physical resource element bundles according to an interleaving function, wherein the first physical resource element bundles comprise actual physical resource element bundles and one or more virtual physical resource element bundles;
   marking a physical resource element bundle in the interleaved first physical resource element bundles without any corresponding actual physical resource element bundle as an invalid physical resource element bundle;
   determining a first correspondence of the valid physical resource element bundles in the interleaved first physical resource element bundles with respect to an actual sequence of the actual physical resource element bundles; and
   determining, based on the first correspondence and a second correspondence of logical resource elements with respect to the actual sequence, a mapping relationship between the logical resource elements and the actual physical resource element bundles;
   wherein said marking the physical resource element bundle in the interleaved first physical resource element bundles without any corresponding actual physical resource element bundle as the invalid physical resource element bundle comprises:
   determining a quantity of actual physical resource element bundles comprised in the first physical resource element bundles;
   determining, according to a relationship between an interleaving sequence number of an interleaved first physical resource element bundle and the quantity, the invalid physical resource element bundle in the interleaved first physical resource element bundles that does not correspond to any actual physical resource element bundle; and
   marking the invalid physical resource element bundle.

2. The method of claim 1, wherein the interleaving function is:

$$f(j)=(rC+c+n_{shift})\mod(CR),$$

wherein,
   j represents a virtual sequence number of the virtual sequence,
   f(j) refers to an interleaving sequence number after interleaving the virtual sequence number,
   j=cR+r,
   r=0, 1, . . . , R−1,
   c=0, 1, . . . , C−1,
   C=⌈$N^{CORESET}$/(LR)⌉,
   c refers to a row coordinate of an interleaving matrix corresponding to the function,
   r refers to a column coordinate of the interleaving matrix,
   $N^{CORESET}$ refers to an actual quantity of physical resource elements,
   L refers to a quantity of physical resource elements comprised in one physical resource element bundle, R refers to a first preset parameter, $n_{shift}$ refers to a second preset parameter, and mod represents an operation for taking a remainder; and marking the physical resource element bundle in the interleaved first physical resource element bundles without any corresponding actual physical resource element bundle as the invalid physical resource element bundle comprises:

in response to that f(j) is greater than $N^{CORESET}/L-1$, marking f(j) as invalid.

3. The method of claim 2, wherein the determining the first correspondence of the valid physical resource element bundles in the interleaved first physical resource element bundles with respect to the actual sequence of the actual physical resource element bundles comprises:

determining the first correspondence g(m)=f(j) between an actual sequence number m of the actual physical resource element bundles and the virtual sequence number j, wherein in response to that f(j) is valid, g(m)=f(j) is marked, and in response to that f(j) is invalid, a value of j is increased until f(j) is valid, and g(m)=f(j) is marked.

4. The method of claim 3, wherein the determining, based on the first correspondence and the second correspondence of the logical resource elements with respect to the actual sequence, the mapping relationship between the logical resource elements and the actual physical resource element bundles comprises:

determining, based on an order of the actual sequence numbers and a quantity of physical resource element bundles comprised in one logical resource element, the second correspondence between a logical resource element and an actual sequence number; and determining the mapping relationship between the logical resource elements and the actual physical resource element bundles based on the first correspondence and the second correspondence.

5. An electronic device, comprising:

a processor, and memory for storing instructions executable by the processor;

wherein the processor is configured to interleave a virtual sequence of first physical resource element bundles according to an interleaving function, wherein the first physical resource element bundles comprise actual physical resource element bundles and one or more virtual physical resource element bundles;

mark a physical resource element bundle in the interleaved first physical resource element bundles without any corresponding actual physical resource element bundle as an invalid physical resource element bundle;

determine a first correspondence of the valid physical resource element bundles in the interleaved first physical resource element bundles with respect to an actual sequence of the actual physical resource element bundles; and determine, based on the first correspondence and a second correspondence of logical resource elements with respect to the actual sequence, a mapping relationship between the logical resource elements and the actual physical resource element bundles;

wherein the processor is further configured to mark the physical resource element bundle in the interleaved first physical resource element bundles without any corresponding actual physical resource element bundle as the invalid physical resource element bundle by:

determining a quantity of actual physical resource element bundles comprised in the first physical resource element bundles;

determining, according to a relationship between an interleaving sequence number of an interleaved first physical resource element bundle and the quantity, the invalid physical resource element bundle in the interleaved first physical resource element bundles that does not correspond to any actual physical resource element bundle; and marking the invalid physical resource element bundle.

6. The electronic device of claim 5, wherein the interleaving function is:

$$f(j)=(rC+c+n_{shift})\mod(CR),$$

wherein, j represents a virtual sequence number of the virtual sequence, f(j) refers to an interleaving sequence number after interleaving the virtual sequence number, j=cR+r, r=0, 1, . . . , R−1, c=0, 1, . . . , C−1, $C=\lceil N^{CORESET}/(LR) \rceil$, c refers to a row coordinate of an interleaving matrix corresponding to the function, r refers to a column coordinate of the interleaving matrix, $N^{CORESET}$ refers to an actual quantity of physical resource elements, L refers to a quantity of physical resource elements comprised in one physical resource element bundle, R refers to a first preset parameter, $n_{shift}$ refers to a second preset parameter, and mod represents an operation for taking a remainder; and marking the physical resource element bundle in the interleaved first physical resource element bundles without any corresponding actual physical resource element bundle as the invalid physical resource element bundle comprises:

in response to that f(j) is greater than $N^{CORESET}/L-1$, marking f(j) as invalid.

7. The electronic device of claim 6, wherein the determining the first correspondence of the valid physical resource element bundles in the interleaved first physical resource element bundles with respect to the actual sequence of the actual physical resource element bundles comprises:

determining the first correspondence g(m)=f(j) between an actual sequence number m and the virtual sequence number j, wherein in response to that f(j) is valid, g(m)=f(j) is marked, and in response to that f(j) is invalid, a value of j is increased until f(j) is valid, and g(m)=f(j) is marked.

8. The electronic device of claim 7, wherein the determining, based on the first correspondence and the second correspondence of the logical resource elements with respect to the actual sequence, the mapping relationship between the logical resource elements and the actual physical resource element bundles comprises:

determining, based on an order of the actual sequence numbers and a quantity of physical resource element bundles comprised in one logical resource element, the second correspondence between a logical resource element and an actual sequence number; and determining the mapping relationship between the logical resource elements and the actual physical resource element bundles based on the first correspondence and the second correspondence.

9. A non-transitory computer-readable storage medium storing a computer program that, when executed by one or more processing circuits, cause the one or more processing circuits to perform:

interleaving a virtual sequence of first physical resource element bundles according to an interleaving function, wherein the first physical resource element bundles comprise actual physical resource element bundles and one or more virtual physical resource element bundles;

marking a physical resource element bundle in the interleaved first physical resource element bundles without any corresponding actual physical resource element bundle as an invalid physical resource element bundle;

determining a first correspondence of the valid physical resource element bundles in the interleaved first physical resource element bundles with respect to an actual sequence of the actual physical resource element bundles; and determining, based on the first correspondence and a second correspondence of logical resource elements with respect to the actual sequence, a mapping relationship between the logical resource elements and the actual physical resource element bundles;

wherein said marking the physical resource element bundle in the interleaved first physical resource element bundles without any corresponding actual physical resource element bundle as the invalid physical resource element bundle comprises:

determining a quantity of actual physical resource element bundles comprised in the first physical resource element bundles;

determining, according to a relationship between an interleaving sequence number of an interleaved first physical resource element bundle and the quantity, the invalid physical resource element bundle in the interleaved first physical resource element bundles that does not correspond to any actual physical resource element bundle; and marking the invalid physical resource element bundle.

10. The non-transitory computer-readable storage medium of claim 9, wherein the interleaving function is:

$f(j)=(rC+c+n_{shift})\mod(CR)$, wherein, j represents a virtual sequence number of the virtual sequence, f(j) refers to an interleaving sequence number after interleaving the virtual sequence number, j=cR+r, r=0, 1, . . . , R−1, c=0, 1, . . . , C−1, $C=\lceil N^{CORESET}/(LR) \rceil$, c refers to a row coordinate of an interleaving matrix corresponding to the function, r refers to a column coordinate of the interleaving matrix, $N^{CORESET}$ refers to an actual quantity of physical resource elements, L refers to a quantity of physical resource elements comprised in one physical resource element bundle, R refers to a first preset parameter, $n_{shift}$ refers to a second preset parameter, and mod represents an operation for taking a remainder; and marking the physical resource element bundle in the interleaved first physical resource element bundles without any corresponding actual physical resource element bundle as the invalid physical resource element bundle comprises:

in response to that f(j) is greater than $N^{CORESET}/L-1$, marking f(j) as invalid.

11. The non-transitory computer-readable storage medium of claim 10, wherein determining the first correspondence of the valid physical resource element bundles in the interleaved first physical resource element bundles with respect to the actual sequence of the actual physical resource element bundles comprises:

determining the first correspondence g(m)=f(j) between an actual sequence number m of the actual physical resource element bundles and the virtual sequence number j, wherein in response to that f(j) is valid, g(m)=f(j) is marked, and in response to that f(j) is invalid, a value of j is increased until f(j) is valid, and g(m)=f(j) is marked.

12. The non-transitory computer-readable storage medium of claim 11, wherein the determining, based on the first correspondence and the second correspondence of the logical resource elements with respect to the actual sequence, the mapping relationship between the logical resource elements and the actual physical resource element bundles comprises:

determining, based on an order of the actual sequence numbers and a quantity of physical resource element bundles comprised in one logical resource element, the second correspondence between a logical resource element and an actual sequence number; and determining the mapping relationship between the logical resource elements and the actual physical resource element bundles based on the first correspondence and the second correspondence.

13. The method of claim 1, further comprising establishing the mapping relationship between the logical resource elements and the actual physical resource element bundles, while avoiding the logical resource elements mapping to physical resource element bundles with invalid sequence numbers.

14. The method of claim 13, further comprising mapping different logical resource elements not to a same physical resource element, thereby ensuring reasonability of the mapping relationship and that resource transmission will not be problematic.

15. The method of claim 14, wherein the actual physical resource element bundles comprise Resource Element Groups (REGs).

16. The method of claim 15, wherein the logical resource elements comprise Control Channel Elements (CCEs).

17. The method of claim 16, wherein the method is implemented with an electronic apparatus comprising at least one of a mobile terminal and a base station, and having a display screen configured to display a communication status of the electronic apparatus.

* * * * *